United States Patent
Niebling et al.

(10) Patent No.: US 9,625,277 B2
(45) Date of Patent: Apr. 18, 2017

(54) SENSOR ARRANGEMENT FOR A DRIVEN WHEEL HUB-ROLLING BEARING ARRANGEMENT WITH A SIGNAL GENERATOR, A SENSOR AND A SEALING CAP

(71) Applicant: Schaeffler Technologies AG & Co. KG, Herzogenaurach (DE)

(72) Inventors: Peter Niebling, Bad Kissingen (DE); Roland Langer, Schwanfeld (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 30 days.

(21) Appl. No.: 14/428,892

(22) PCT Filed: Aug. 2, 2013

(86) PCT No.: PCT/DE2013/200093
§ 371 (c)(1),
(2) Date: Mar. 17, 2015

(87) PCT Pub. No.: WO2014/044260
PCT Pub. Date: Mar. 27, 2014

(65) Prior Publication Data
US 2015/0233734 A1    Aug. 20, 2015

(30) Foreign Application Priority Data

Sep. 21, 2012    (DE) .......................... 10 2012 216 940

(51) Int. Cl.
*F16C 32/00*    (2006.01)
*F16C 41/04*    (2006.01)
(Continued)

(52) U.S. Cl.
CPC ................ *G01D 5/14* (2013.01); *B60T 17/22* (2013.01); *F16D 66/00* (2013.01)

(58) Field of Classification Search
CPC .. F16C 41/007; F16C 2326/02; F16C 19/186; G01R 35/005; G01R 33/0017;
(Continued)

(56) References Cited

U.S. PATENT DOCUMENTS 5,575,568 A * 11/1996 Rigaux ............... F16C 33/7879
324/174
5,967,669 A    10/1999 Ohtsuki
(Continued)

FOREIGN PATENT DOCUMENTS

DE    10 2004 048 654 A1    4/2006
DE    102004048654    4/2006
(Continued)

*Primary Examiner* — Arleen M Vazquez
*Assistant Examiner* — Taqi Nasir
(74) *Attorney, Agent, or Firm* — Davidson, Davidson & Kappel, LLC

(57) ABSTRACT

An ABS encoder arrangement for a driven wheel bearing unit, with a multi-pole ring, a sensor device with a sensor head, and an annular cap element that has an annular wall portion which shields a cap interior against the exterior. The annular wall section extends through an intermediate region lying between the multi-pole ring and an end face of the sensor head. An extension concentric with the axis of rotation of the multi-pole ring and extending axially over a circumferential area of an articulated shaft head is connected to the annular wall section on a side facing away from the multi-pole ring. In the end portion of the extension facing away from the multi-pole ring and extending over the articulated shaft head, the extension forms a circumferential profile that radially stiffens the extension and forms an annular edge which extends into a circumferential groove of the articulated shaft head and forms a channel cross-section open to the outside.

9 Claims, 2 Drawing Sheets

(51) Int. Cl.
  *G01D 5/14* (2006.01)
  *F16D 66/00* (2006.01)
  *B60T 17/22* (2006.01)
(58) Field of Classification Search
  CPC .. G01R 33/04; G01R 33/077; G01R 33/0029; G01R 33/0035; G01R 33/02; G01R 33/028; G01R 33/093; G01R 15/20; G01R 15/205; G01R 19/0092
  USPC ...... 324/201–206, 200, 207.11–207.26, 331, 324/345, 381, 389, 210–219, 244–263; 384/448, 489, 544, 589
  See application file for complete search history.

(56) References Cited

U.S. PATENT DOCUMENTS

| | | | |
|---|---|---|---|
| 6,045,133 A * | 4/2000 | Lannert | F16C 33/7853 277/321 |
| 6,899,463 B2 | 5/2005 | Vignotto et al. | |
| 7,147,379 B2 | 12/2006 | Ohtsuki et al. | |
| 7,671,582 B2 * | 3/2010 | Yabe | F16C 33/7879 324/174 |
| 8,500,338 B2 | 8/2013 | Walter et al. | |
| 2003/0138175 A1 * | 7/2003 | Vignotto | F16C 33/7879 384/448 |
| 2014/0321784 A1 | 10/2014 | Niebling et al. | |

FOREIGN PATENT DOCUMENTS

| | | |
|---|---|---|
| DE | 10 2008 038 682 | 2/2010 |
| DE | 102009023041 | 12/2010 |
| EP | 1329728 | 7/2003 |
| EP | 2 048 387 | 4/2009 |
| JP | 2002195280 | 7/2002 |
| JP | 2006 038 160 A1 | 2/2006 |
| JP | 2007183247 | 7/2007 |
| JP | 2009197941 | 9/2009 |
| WO | WO2013120541 | 8/2013 |

* cited by examiner

SENSOR ARRANGEMENT FOR A DRIVEN WHEEL HUB-ROLLING BEARING ARRANGEMENT WITH A SIGNAL GENERATOR, A SENSOR AND A SEALING CAP

The present invention relates to an ABS encoder system, which as such is used to generate signals indicating wheel rotation in the area of a wheel bearing, the ABS encoder system including a wheel-side revolving multi-pole ring and a sensor device for detecting the magnetic field generated on the part of the multi-pole ring.

BACKGROUND

Such a wheel bearing unit with an ABS encoder system is known from DE 10 2004 048 A1. A seal arrangement is provided in this wheel bearing unit, which includes a hub-side fixed sealing ring having a sealing lip. The sealing ring has an extension that axially overlaps an end section of a drive shaft head. Affixed to the end section of the extension is an elastomer sealing lip, which is in rubbing connection against an outer circumferential surface of the drive shaft head.

An ABS encoder system is known from U.S. Pat. No. 5,967,669 A1, which includes a wheel-side revolving multi-pole ring and a sensor device. The sensor device is affixed to the inside of a cover cap. The cover cap is provided with a socket section, into which a sensor cable is pluggable. Plug contacts, which are connected to the sensor device, are situated in the interior of the socket section. The multi-pole ring itself includes a cylinder jacket section on the inner wall on which the multi-pole structure is situated, which has zones with varying degrees of field emission. The sensor device radially engages from within, in an interior area of the multi-pole ring and in this way detects the magnetic field generated by the multi-pole ring.

An ABS encoder system is known from U.S. Pat. No. 7,147,379, which includes a multi-pole ring integrated into a cartridge seal, which as such is covered by a cover ring which is made of a non-magnetic material. A sensor head is situated on one side of the cover ring facing away from the multi-pole ring. This detects the field emitted by the multi-pole ring.

A wheel bearing unit is likewise known from JP 2006 038 160 A1, which is provided with an encoder system in the area of a bearing ring gap. This encoder system includes a multi-pole ring which is covered from its outside via a ring element fixed in a stationary manner to the hub carrier. Also in this case, similar to the prior art according to DE 10 2004 048 A1, the required sealing effect is achieved through the use of a sealing ring element which is made of an elastomer material and is in rubbing contact with a circumferential component of the wheel bearing unit.

SUMMARY OF THE INVENTION

It is an object of the invention to provide an ABS encoder system which is characterized by a long operating life through high functional reliability.

The present invention advantageously provides an ABS encoder system in which the sensor head is accessible from the outside, the multi-pole ring is advantageously protected and moreover any particles adhering to the multi-pole structure are effectively shielded from the sensor head.

According to a particularly preferred specific embodiment of the present invention, the circumferential profile formed on the axial end area of the extension is designed in such a way that it forms at least one radially, outwardly open circumferential channel. This circumferential channel may be designed in such a way that it dips at least partially into a circumferential groove formed on the drive shaft head, while leaving a clearance gap, and thus forms a labyrinth structure with this circumferential groove. The channel depth measured in the radial direction in this case preferably corresponds to approximately two to six times the wall thickness of the extension. The axial length measured on the channel bottom of the circumferential channel preferably corresponds to approximately two to seven times the wall thickness of the extension. The channel cross-section of the circumferential channel is preferably designed in such a way that it appears as a trapezoid in an intersecting plane containing the circumferential axis of the multi-pole ring. The width of the channel cross-section measured in the direction of the circumferential axis widens as the distance from the circumferential axis increases.

The extension may be designed as an essentially cylindrical annular body. It may also be designed as a cone-shaped jacket. The extension may furthermore form one or multiple steps and in this way taper toward the drive shaft head during operation. The axial length of the extension is larger than the width of the multi-pole structure.

According to a particularly preferred specific embodiment of the present invention, the annular cap element is made of a non-ferromagnetic material. In this case, the annular cap element may be made as a deep-drawn part from a sheet material, in particular a corrosion-resistant chromium-nickel steel, or even from a non-ferrous metal sheet.

As an alternative to the aforementioned specific embodiment of the annular cap element as a sheet metal deep-drawn part, it is also possible to make the annular cap element out of a plastic material, for example as an injection-molded part or as a blown part.

The annular cap element may be designed with respect to its external geometry in such a way that each annular wall section is formed as an annular disk section which is essentially radially oriented to the bearing shaft. This variant is particularly suitable for the implementation of encoder systems in which the multi-pole ring forms an annular disk which is scanned from the front side, i.e., "from in front." The annular wall section preferably extends over an angular range of 360° essentially equidistant from the multi-pole ring.

As an alternative to the aforementioned specific embodiment, it is also possible to design the annular cap element in such a way that the annular wall section is formed as an essentially cylindrical ring bushing section essentially coaxially oriented to the bearing shaft. This configuration makes it possible to design the multi-pole ring as a cylinder bush, the field of which is scanned radially from the outside. It is also possible to design the multi-pole ring as a cone-shaped jacket structure.

The annular cap element is preferably designed in such a way that it forms a passage opening for an axle journal. This passage opening is preferably formed by an extension concentrical to the bearing shaft, which adjoins the annular wall section. The passage opening skirting the annular border may be provided with a profiling which stiffens the wall section skirting the passage opening, and furthermore forms a retaining structure which wards any particles or splash water off the annular gap formed from the interaction with the axle journal. That extension may constitute a tapering structure and, for example, be formed for this purpose as a relatively flat and essentially radially oriented annular disk section, as a cone-shaped jacket section or even as a cylinder jacket section.

According to one particular aspect of the invention, a support structure may be formed on the annular cap element, which makes it possible to fix the sensor head to the annular cap element. This support structure may be formed as a socket section, into which the sensor head is pluggable. Otherwise, the support structure may also form other types of anchoring geometries in which the sensor head may be secured via corresponding complementary structures.

The anchoring of the annular cap element to a bearing carrier is preferably carried out in combination with a seat ring section which is integrally formed with the annular cap element and, for example, may be pressed onto a cylindrical collar section of the bearing carrier using a strong press fit.

A discharge opening is preferably provided on the annular cap element, in particular a bore hole. This is situated on a place underneath the mounting position of the annular cap element. A cap or cover structure is formed in the area of the discharge opening, which prevents direct entry of splash water or thrown particles. The sensor head may rest against the annular cap element, or approach it, leaving a gap.

BRIEF DESCRIPTION OF THE DRAWINGS

Further details and features of the present invention are derived from the following description in connection with the drawings.

DETAILED DESCRIPTION

Figure 1:
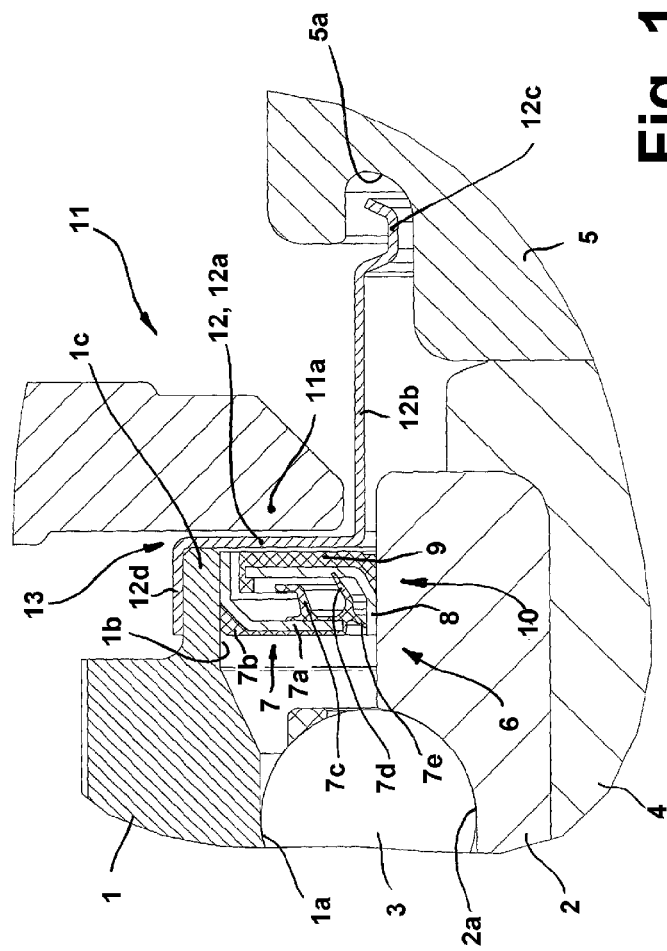
FIG. 1 shows an axial sectional view of a first specific embodiment of an ABS encoder system according to the present invention.

An ABS encoder system according to the present invention is illustrated in FIG. 1 in the form of a detailed representation of its structure. The ABS encoder unit according to the present invention is incorporated into a wheel bearing. The wheel bearing itself includes a hub carrier 1 having a rolling element track 1a formed directly thereon, a bearing inner ring 2 which likewise forms a rolling element track 2a, as well as rolling elements 3 which are accommodated in a rolling element circumferential space formed between both rolling element tracks 1a and 2a. The rolling bearing formed in hub carrier 1 is only partially represented in this case, and is designed, for example, as an angular ball bearing. Bearing inner ring 2 rests on a hub pin 4. Although not shown in detail here, hub pin 4 is designed as a hollow pin with internal gear teeth. Within this hollow pin sits an externally toothed section of a drive shaft head 5.

The bearing unit accommodated in hub carrier 1 is sealed by a sealing device 6. This sealing device 6 is designed as a cartridge seal and includes a sealing ring 7 which has a ring core 7a and a molded-on elastomer structure 7b. Elastomer structure 7b forms multiple sealing lips 7c, 7d and 7e. These sealing lips 7c, 7d and 7e form a sealing system on angular ring 8. A so-called multi-pole structure 9 is attached to a side of angular ring 8 facing away from sealing lips 7c, 7d and 7e. This multi-pole structure 9 contains magnetized particles. Overall, the magnetization of these particles is coordinated in such a way that the multi-pole structure in the circumferential direction is made up of + and − zones. Angular ring 8 and multi-pole structure 9 resting thereon form a so-called multi-pole ring 10. The multi-pole ring rests on a cylindrical section of bearing inner ring 2. Sealing ring 7 rests in a cylindrical inner circumferential surface 1b of hub carrier 1.

The wheel bearing represented is provided with an ABS encoder system. This ABS encoder system includes the previously mentioned multi-pole ring 10, which carries that multi-pole structure 9. Furthermore, the ABS encoder system also includes a sensor device 11 having a sensor 11a for detecting the magnetic field generated on the part of multi-pole structure 9. The ABS encoder system according to the present invention is characterized in that an annular cap element 12 is provided, which has an annular wall section 12a, which seals off a cap interior, housing the multi-pole ring, toward the outside. That annular wall section 12a is designed in such a way that it extends through an intermediate area 13 situated between multi-pole ring 10 and a front surface of sensor 11a. In addition, an essentially cylindrical extension 12b is connected to annular wall section 12a on a side facing away from multi-pole ring 10, concentrical to the circumferential axis of the multi-pole ring, and which axially overlaps in the mounting position a circumferential area of a drive shaft head 5, extension 12b, in its end area facing away from the multi-pole ring and surrounding the drive shaft head, forming a circumferential profile which radially stiffens extension 12b.

The annular cap element in this case is made of a non-ferromagnetic sheet material as a deep-drawn part. The annular wall section 12a extending through intermediate area 13 is designed in this exemplary embodiment as an extending annular disc section aligned essentially radially to the bearing shaft, equidistant over 360° to the multi-pole ring.

An extension 12b concentrical to the bearing shaft is connected to annular wall section 12a on its radially internal inner border area. This extension 12b extends into the area of drive shaft head 5 and there forms an annular border 12c which skirts a passage opening. This annular border 12c extends into a circumferential groove 5a of drive shaft head 5. The clearances are dimensioned in such a way that component contact is reliably avoided, and that a preferably effective shielding of the inner area of that extension 12b is achieved.

By the cross-sectional configuration shown here of annular cap element 12 in the area of the passage opening, there is a sufficiently effective particle protection and also an advantageous stiffening of annular border 12c.

Here, multi-pole ring 10 forms an "axial coding" structure, i.e., a structure that generates a rising magnetic field across the front face of the multi-pole ring. The sensor head is axially moved towards multi-pole ring 10, but is shielded from it by annular wall section 12a, and is therefore situated outside of the cap interior. The magnetic field generated by multi-pole ring 10 penetrates annular wall section 12a and may therefore be detected by sensor head 11a. Sensor head 11a is protected from any metallic particles revolving with the multi-pole ring by annular wall section 12a.

Annular cap element 12 has a seat ring section 12d and is anchored via this seat ring section 12d to a collar section 1c of hub carrier 1 under a strong press fit. Collar section 1c forms that inner circumferential wall 1b, on which sealing ring 7 rests.

Figure 2:
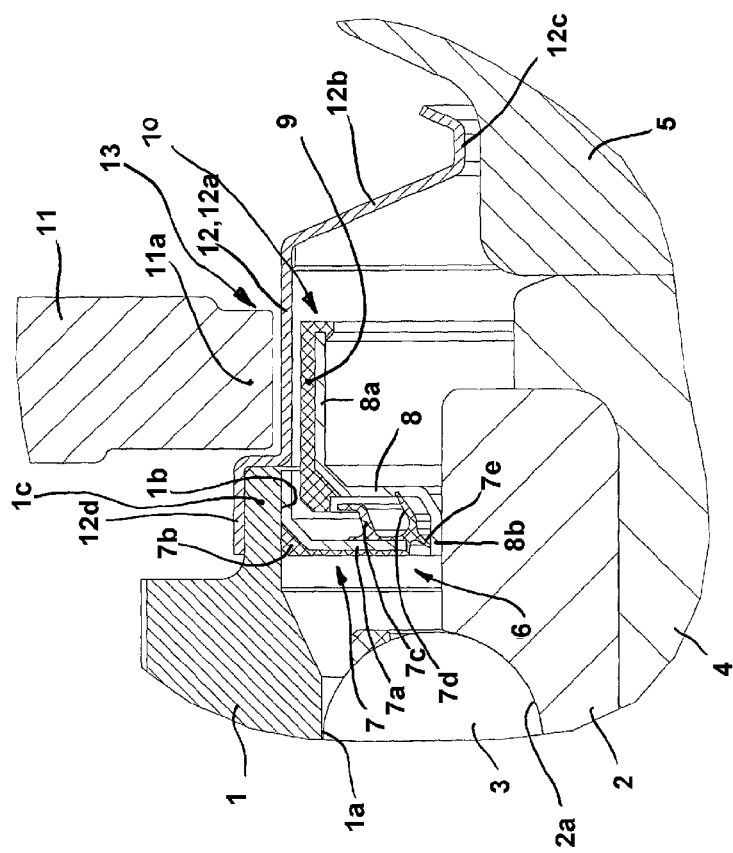
FIG. 2 shows an axial sectional view of a second specific embodiment of an ABS encoder system according to the present invention.

An ABS encoder system according to the present invention is likewise illustrated in FIG. 2 in the form of a detailed representation of its structure according to a second specific embodiment of the present invention. This is similar to the aforementioned encoder system in many features. The ABS encoder unit according to the present invention is again incorporated into a wheel bearing. The wheel bearing itself includes a hub carrier 1 having a rolling element track 1a formed directly thereon, a bearing inner ring 2 which likewise forms a rolling element track 2a, as well as rolling elements 3 which are accommodated in a rolling element circumferential space formed between both rolling element tracks 1a and 2a.

Also in this exemplary embodiment, the rolling bearing formed in hub carrier 1 is only partially represented, and overall is designed as an angular ball bearing. Bearing inner ring 2 rests on a hub pin 4. Hub pin 4 is designed as a hollow pin having interior and front-facing gear teeth. A drive shaft head 5 engages in the hub pin with axial or radial gear teeth.

The bearing unit accommodated in hub carrier 1 is sealed by a sealing device 6. This sealing device 6 is designed as a cartridge seal and includes a sealing ring 7 which has a ring core 7a and a molded-on elastomer structure 7b. Elastomer structure 7b forms multiple sealing lips 7c, 7d and 7e in a manner similar to that in the exemplary embodiment according to FIG. 1. These sealing lips 7c, 7d and 7e form a sealing system toward angular ring 8.

Angular ring 8 carries an annular cylinder section 8a. A multi-pole structure 9 is attached to an outer circumferential surface of annular cylinder section 8a. This multi-pole structure 9 again contains magnetized particles. The magnetization of these particles is coordinated in such a way that the multi-pole structure in the circumferential direction is made up of + and − zones. Angular ring 8 and multi-pole structure 9 resting thereon form a multi-pole ring 10. Multi-pole ring 10 rests via an inner ring section 8b with moderate press fit on a cylindrical section of bearing inner ring 2. Sealing ring 7 rests on a cylindrical inner circumferential surface 1b of hub carrier 1.

The wheel bearing represented is again provided with an ABS encoder system. This ABS encoder system includes the previously mentioned multi-pole ring 10, which carries that multi-pole structure 9. Furthermore, the ABS encoder system also includes a sensor device 11 having a sensor head 11a for detecting the magnetic field generated on the part of multi-pole structure 9. The ABS encoder system according to the present invention is again characterized in that an annular cap element 12 is provided, which has an annular wall section 12a, which seals off a cap interior, housing the multi-pole ring, toward the outside. That annular wall section 12a is designed in such a way that it extends through an intermediate area 13 situated between multi-pole ring 10 and a front surface of sensor head 11a. In addition, here an essentially truncated, conically tapering extension 12b is connected to the annular wall section 12a on a side facing away from multi-pole ring 10, concentrical to the circumferential axis of the multi-pole ring 10, and which axially overlaps in the mounting position a circumferential area of a drive shaft head 5, extension 12b, in its end area facing away from the multi-pole ring and surrounding the drive shaft head, forming a circumferential profile which radially stiffens extension 12b.

Annular cap element 12 is made of a non-ferromagnetic sheet material, as a deep-drawn part, in a manner similar to the exemplary embodiment according to FIG. 1. The annular wall section 12a extending through intermediate area 13 is designed in this exemplary embodiment as a cylinder jacket section aligned essentially coaxially to the bearing shaft.

An extension 12b concentrical to the bearing shaft is connected to annular wall section 12a on its side facing away from hub carrier 1. This extension 12b extends into the area of drive shaft head 5 and there forms an annular border 12c that skirts a passage opening. The extent of the gap remaining between the inner wall of annular border 12c and the outer wall of drive shaft head 5 is dimensioned in such a way that component contact is reliably avoided, and a preferably effective shielding of the inner area of that extension 12b is achieved.

Here, multi-pole ring 10 forms a "radial coding" structure, i.e., a structure which generates a radially rising magnetic field across the outer circumferential surface of the multi-pole ring 10. The sensor head is radially moved toward multi-pole ring 10, but is shielded from it by annular wall section 12a. The radially emitted magnetic field generated by multi-pole ring 10 penetrates annular wall section 12a and may therefore be detected by sensor head 11a. Annular wall section 12a extends over the entire circumferential area of the multi-pole ring.

Annular cap element 12 has a seat ring section 12d and is anchored via this seat ring section 12d to a collar section 1c of hub carrier 1 under a strong press fit. Collar section 1c forms that inner circumferential wall 1b, in which sealing ring 7 rests as in the exemplary embodiment according to FIG. 1.

Although not shown here, it is possible to form a support structure on annular cap element 12, e.g., in the form of a socket section, to secure sensor head 11a directly to annular cap element 12.

LIST OF REFERENCE NUMERALS 1 hub carrier
1a rolling element track
1b inner circumferential surface
1c collar section
2 bearing inner ring
2a rolling element track
3 rolling element
4 hub pin
5 drive shaft head
5a circumferential groove
6 sealing device
7 sealing ring
7a ring core
7b elastomer structure
7c sealing lip
7d sealing lip
7e sealing lip
8 angular ring
8a annular cylinder section
8b inner ring section
9 multi-pole structure
10 multi-pole ring
11 sensor device
11a sensor head
12 annular cap element
12a annular wall section
12b extension
12c annular border
12d seat ring section
13 intermediate area

The invention claimed is:
1. An ABS encoder system comprising:
a multi-pole ring carrying a multi-pole structure;
a sensor device having a sensor head for detecting a magnetic field generated by the multi-pole structure; and an annular cap element having an annular wall section sealing off a cap interior toward the outside, the cap interior housing the multi-pole ring;

the annular wall section extending through an intermediate area situated between the multi-pole ring and a front surface of the sensor head, an extension concentrical to the circumferential axis of the multi-pole ring being connected to the annular wall section, and axially overlapping in a mounting position a circumferential area of a drive shaft head, the extension, in an end area facing away from the multi-pole ring and surrounding the drive shaft head, forming a circumferential profile radially stiffening the extension;

the circumferential profile forming an annular border extending axially away from the multi-pole ring into a circumferential groove of the drive shaft head, and the annular border forms a channel cross-section open to the outside.

2. The ABS encoder system as recited in claim 1 wherein the annular cap element is made of a non-ferromagnetic material.

3. The ABS encoder system as recited in claim 2 wherein the annular cap element is made of a sheet material as a deep-drawn part.

4. The ABS encoder system as recited in claim 2 wherein the annular cap element is made of a plastic material.

5. The ABS encoder system as recited in claim 1 wherein the annular wall section is formed as an annular disk section aligned radially to a bearing shaft.

6. The ABS encoder system as recited in claim 1 wherein the annular border is located axially beyond the multi-pole ring and the sensor device.

7. The ABS encoder system as recited in claim 1 wherein the extension, concentrical to a bearing shaft and adjoining the annular wall section, has an end area facing away from the annular wall section.

8. The ABS encoder system as recited in claim 7 wherein the extension conically tapers to narrow away from the annular wall section.

9. The ABS encoder system as recited in claim 1 wherein the annular cap element has a seat ring section.

* * * * *